US011775838B2

(12) United States Patent
Li et al.

(10) Patent No.: US 11,775,838 B2
(45) Date of Patent: *Oct. 3, 2023

(54) IMAGE CAPTIONING WITH WEAKLY-SUPERVISED ATTENTION PENALTY (71) Applicant: Ancestry.com Operations Inc., Lehi, UT (US)

(72) Inventors: Jiayun Li, Los Angeles, CA (US); Mohammad K. Ebrahimpour, Fremont, CA (US); Azadeh Moghtaderi, San Francisco, CA (US); Yen-Yun Yu, Murray, UT (US)

(73) Assignee: Ancestry.com Operations Inc., Lehi, UT (US)

( * ) Notice: Subject to any disclaimer, the term of this patent is extended or adjusted under 35 U.S.C. 154(b) by 99 days.

This patent is subject to a terminal disclaimer.

(21) Appl. No.: 17/501,199

(22) Filed: Oct. 14, 2021

(65) Prior Publication Data
US 2022/0067438 A1 Mar. 3, 2022

Related U.S. Application Data (63) Continuation of application No. 16/596,063, filed on Oct. 8, 2019, now Pat. No. 11,170,257.
(Continued)

(51) Int. Cl.
*G06N 3/08* (2023.01)
*G06N 3/084* (2023.01)
(Continued)

(52) U.S. Cl.
CPC ......... *G06N 3/084* (2013.01); *G06F 18/214* (2023.01); *G06F 18/217* (2023.01); *G06N 3/044* (2023.01);
(Continued)

(58) Field of Classification Search
CPC ..... G06F 18/214; G06F 18/217; G06N 3/044; G06N 3/045; G06N 3/0445; G06N 3/0454;
(Continued)

(56) References Cited

U.S. PATENT DOCUMENTS

2017/0098153 A1 4/2017 Mao et al.
2017/0200066 A1 7/2017 Wang et al.
(Continued)

FOREIGN PATENT DOCUMENTS

JP 6150405 B2 6/2017

OTHER PUBLICATIONS

Search Report for European Application No. 19872956.8 dated Jun. 3, 2022, 10 pages.
(Continued)

*Primary Examiner* — Juan A Torres
(74) *Attorney, Agent, or Firm* — Keller Preece PLLC (57) ABSTRACT Techniques for training a machine-learning (ML) model for captioning images are disclosed. A plurality of feature vectors and a plurality of visual attention maps are generated by a visual model of the ML model based on an input image. Each of the plurality of feature vectors correspond to different regions of the input image. A plurality of caption attention maps are generated by an attention model of the ML model based on the plurality of feature vectors. An attention penalty is calculated based on a comparison between the caption attention maps and the visual attention maps. A loss function is calculated based on the attention penalty. One or both of the visual model and the attention model are trained using the loss function.

20 Claims, 8 Drawing Sheets

Related U.S. Application Data (60) Provisional application No. 62/745,754, filed on Oct. 15, 2018, provisional application No. 62/860,003, filed on Jun. 11, 2019.

(51) Int. Cl.

| | | |
|---|---|---|
| *G06F 18/214* | (2023.01) | |
| *G06F 18/21* | (2023.01) | |
| *G06N 3/044* | (2023.01) | |
| *G06N 3/045* | (2023.01) | |
| *G06V 10/764* | (2022.01) | |
| *G06V 10/778* | (2022.01) | |
| *G06V 10/82* | (2022.01) | |
| *G06V 10/44* | (2022.01) | |
| *G06V 20/70* | (2022.01) | |
| *G06V 20/20* | (2022.01) | |

(52) U.S. Cl.
CPC ............... *G06N 3/045* (2023.01); *G06N 3/08* (2013.01); *G06V 10/454* (2022.01); *G06V 10/764* (2022.01); *G06V 10/7788* (2022.01); *G06V 10/82* (2022.01); *G06V 20/20* (2022.01); *G06V 20/70* (2022.01)

(58) Field of Classification Search
CPC ........ G06N 3/08; G06N 3/084; G06V 10/454; G06V 10/764; G06V 10/7788; G06V 10/82; G06V 20/20; G06V 20/70
USPC ......................................................... 382/156
See application file for complete search history.

(56) References Cited

U.S. PATENT DOCUMENTS

| | | |
|---|---|---|
| 2018/0143966 A1 | 5/2018 | Lu et al. |
| 2020/0057805 A1 | 2/2020 | Lu et al. |
| 2020/0320353 A1 | 10/2020 | Linjie et al. |

OTHER PUBLICATIONS

Fang Fang et al., "Image Captioning with Word Level Attention," 2018 25$^{th}$ IEEE International Conference On Image Processing (ICIP), IEEE, Oct. 7, 2018, pp. 1278-1282, XP033455128, DOI: 10.1109/ICIP.2018.8451558 [retrieved on Aug. 29, 2018].

Fang Fang et al., "Refining Attention: A Sequential Attention Model for Image Captioning," 2018 IEEE International Conference On Multimedia and Expo (ICME), IEEE, Jul. 23, 2018, pp. 1-6, XP033417516, DOI: 10.1109/ICME.2018.8486437 [retrieved on Oct. 8, 2018].

Liu Xiaoxiao et al., "A survey on deep neural network-based image captioning," Visual Computer, Springer, Berlin, DE, vol. 35, No. 3, Jun. 9, 2018, pp. 445-470, XP036727418, ISSN: 0178-2789, DOI: 10.1007/S00371-018-1566-Y [retrieved on Jun. 9, 2018].

International Preliminary Report on Patentability received in PCT/US2019/055326 dated Apr. 14, 2021, 2021.

International Search Report and Written Opinion dated Jan. 8, 2020 in related application No. PC/082019/055326. all pages, (2020).

Wu, L. et al. "Where-and-When to Look: Deep Siamese Attention Networks for Video-based Person Re-identification": Cornell University: Publication (online). Oct. 14, 2018, Retrieved from Internet URL: https://arix.orgpci/1808.01811.001.00 1-13, (2018).

U.S. Pat. No. 11,170,257, Apr. 2, 2021, Office Action.

U.S. Pat. No. 11,170,257, Jul. 9, 2021, Notice of Allowance.

IMAGE CAPTIONING WITH WEAKLY-SUPERVISED ATTENTION PENALTY

CROSS-REFERENCES TO RELATED APPLICATIONS

This application is a continuation of U.S. Non-provisional application Ser. No. 16/596,063 entitled "IMAGE CAPTIONING WITH WEAKLY-SUPERVISED ATTENTION PENALTY," filed on Oct. 8, 2019, which claims the benefit of priority to U.S. Provisional Patent Application No. 62/745,754, filed Oct. 15, 2018, entitled "AI STORYTELLING MACHINE," and U.S. Provisional Patent Application No. 62/860,003 filed Jun. 11, 2019, entitled "IMAGE CAPTIONING WITH WEAKLY-SUPERVISED ATTENTION PENALTY," the contents of which are herein incorporated in their entirety.

BACKGROUND

Image captioning is the process of producing a textual description, also referred to as a caption, for an image. The caption may be a few words forming a complete or incomplete sentence that are relevant to the image. Such captions may be useful for a number of applications, including family history photo understanding. For example, a user of a family history database may wish to search for a particular image using a text input. By producing relevant captions for each image in the family history database, a simple image retrieval process may employ text comparisons between the text input and the stored captions to search for the particular image.

Various approaches for performing image captioning using machine learning have been employed. In some of these approaches, a neural network is trained to match images with sentences. For example, a neural network may receive an image as an input and may select a sentence from a finite number of sentences (e.g., 1,000,000 or more possible sentences). To produce training data, a user (e.g., a genealogist) may also analyze the image and select the sentence that they believe to be the most relevant caption for the image. The process is repeated numerous times until the neural network is able to select relevant sentences for a wide range of images.

BRIEF SUMMARY OF THE INVENTION

Examples given below provide a summary of the present invention. As used below, any reference to a series of examples is to be understood as a reference to each of those examples disjunctively (e.g., "Examples 1-4" is to be understood as "Examples 1, 2, 3, or 4").

Example 1 is a method of training a machine-learning (ML) model for captioning images, the method comprising: generating, by a visual model of the ML model and based on an input image, a plurality of feature vectors and a plurality of visual attention maps, wherein each of the plurality of feature vectors corresponds to different regions of the input image; generating, by an attention model of the ML model, a plurality of caption attention maps based on the plurality of feature vectors; calculating an attention penalty based on a comparison between the caption attention maps and the visual attention maps; calculating a loss function based on the attention penalty; and training one or both of the visual model and the attention model using the loss function.

Example 2 is the method of example(s) 1, further comprising: generating, by a language model of the ML model, a predicted caption based on the plurality of feature vectors.

Example 3 is the method of example(s) 1-2, further comprising: calculating a caption loss based on a comparison between the predicted caption and a caption label provided by a user, wherein the loss function is calculated based on at least the caption loss and the attention penalty.

Example 4 is the method of example(s) 1-3, further comprising: training the language model using the loss function.

Example 5 is the method of example(s) 1-4, wherein the language model is a long-short term memory (LSTM) model.

Example 6 is the method of example(s) 1-5, wherein the visual model is a convolutional neural network (CNN).

Example 7 is the method of example(s) 1-6, wherein the attention model is a long-short term memory (LSTM) model.

Example 8 is the method of example(s) 1-7, wherein the plurality of visual attention maps and the plurality of caption attention maps are probability distributions.

Example 9 is a non-transitory computer-readable medium comprising instructions that, when executed by one or more processors, cause the one or more processors to perform operations comprising: generating, by a visual model of a machine-learning (ML) model for captioning images and based on an input image, a plurality of feature vectors and a plurality of visual attention maps, wherein each of the plurality of feature vectors corresponds to different regions of the input image; generating, by an attention model of the ML model, a plurality of caption attention maps based on the plurality of feature vectors; calculating an attention penalty based on a comparison between the caption attention maps and the visual attention maps; calculating a loss function based on the attention penalty; and training one or both of the visual model and the attention model using the loss function.

Example 10 is the non-transitory computer-readable medium of example(s) 9, wherein the operations further comprise: generating, by a language model of the ML model, a predicted caption based on the plurality of feature vectors.

Example 11 is the non-transitory computer-readable medium of example(s) 9-10, wherein the operations further comprise: calculating a caption loss based on a comparison between the predicted caption and a caption label provided by a user, wherein the loss function is calculated based on at least the caption loss and the attention penalty.

Example 12 is the non-transitory computer-readable medium of example(s) 9-11, wherein the operations further comprise: training the language model using the loss function.

Example 13 is the non-transitory computer-readable medium of example(s) 9-12, wherein the language model is a long-short term memory (LSTM) model.

Example 14 is the non-transitory computer-readable medium of example(s) 9-13, wherein the visual model is a convolutional neural network (CNN).

Example 15 is the non-transitory computer-readable medium of example(s) 9-14, wherein the attention model is a long-short term memory (LSTM) model.

Example 16 is the non-transitory computer-readable medium of example(s) 9-15, wherein the plurality of visual attention maps and the plurality of caption attention maps are probability distributions.

Example 17 is a system comprising: one or more processors; and a computer-readable medium comprising instructions that, when executed by the one or more processors, cause the one or more processors to perform operations comprising: generating, by a visual model of a machine-learning (ML) model for captioning images and based on an input image, a plurality of feature vectors and a plurality of visual attention maps, wherein each of the plurality of feature vectors corresponds to different regions of the input image; generating, by an attention model of the ML model, a plurality of caption attention maps based on the plurality of feature vectors; calculating an attention penalty based on a comparison between the caption attention maps and the visual attention maps; calculating a loss function based on the attention penalty; and training one or both of the visual model and the attention model using the loss function.

Example 18 is the system of example(s) 17, wherein the operations further comprise: generating, by a language model of the ML model, a predicted caption based on the plurality of feature vectors.

Example 19 is the system of example(s) 17-18, wherein the operations further comprise: calculating a caption loss based on a comparison between the predicted caption and a caption label provided by a user, wherein the loss function is calculated based on at least the caption loss and the attention penalty.

Example 20 is the system of example(s) 17-19, wherein the operations further comprise: training the language model using the loss function.

DETAILED DESCRIPTION

Family historical photo understanding is an open research topic in the genealogical industry and academic community. In order to discover family history, genealogists start by viewing historical photos to obtain hints and information about family members for constructing pedigrees. After building the family tree, genealogists are able to write down narratives about ancestors. The process is complex and requires a significant amount of human effort. Embodiments of the present disclosure provide a novel model that can not only generate labels but also descriptions (e.g., captions) for family historical photos. Image captions can help genealogists efficiently obtain relevant information from photos. Moreover, image labels obtained from captions can potentially be incorporated into search engines or recommender systems to facilitate capability of genealogy services.

Automatic image caption generation requires both fully understanding of image contents and the sophisticated generation of natural sentences. In some instances, a convolutional neural network (CNN) is employed to encode and represent images into feature vectors followed by long-short term memory (LSTM) models to decode visual information into textual representations. The attention module between the CNN and the LSTM helps more relevant visual representations flow into the language model. The attention mechanism not only allows the model to pay attention to important image regions, but also provides visualization about what or where the model focuses on when predicting the next word. Furthermore, the attention modules can provide a sophisticated way of aligning feature representations between the image space and the language space.

In some instances, the attention module is implicitly trained together with other parts using negative log-likelihood loss. The lack of explicit attention guidance can make it difficult for captioning models to learn meaningful attention maps, thus leading to inferior performances. In some embodiments, models can use human annotations for attention correction. However, this type of approach can require fine-grained annotations for each visual concept in captions. Fine-grained labels such as bounding-boxes are available in many open-source captioning datasets, but it can be expensive to generate a new dataset.

Figure 1:
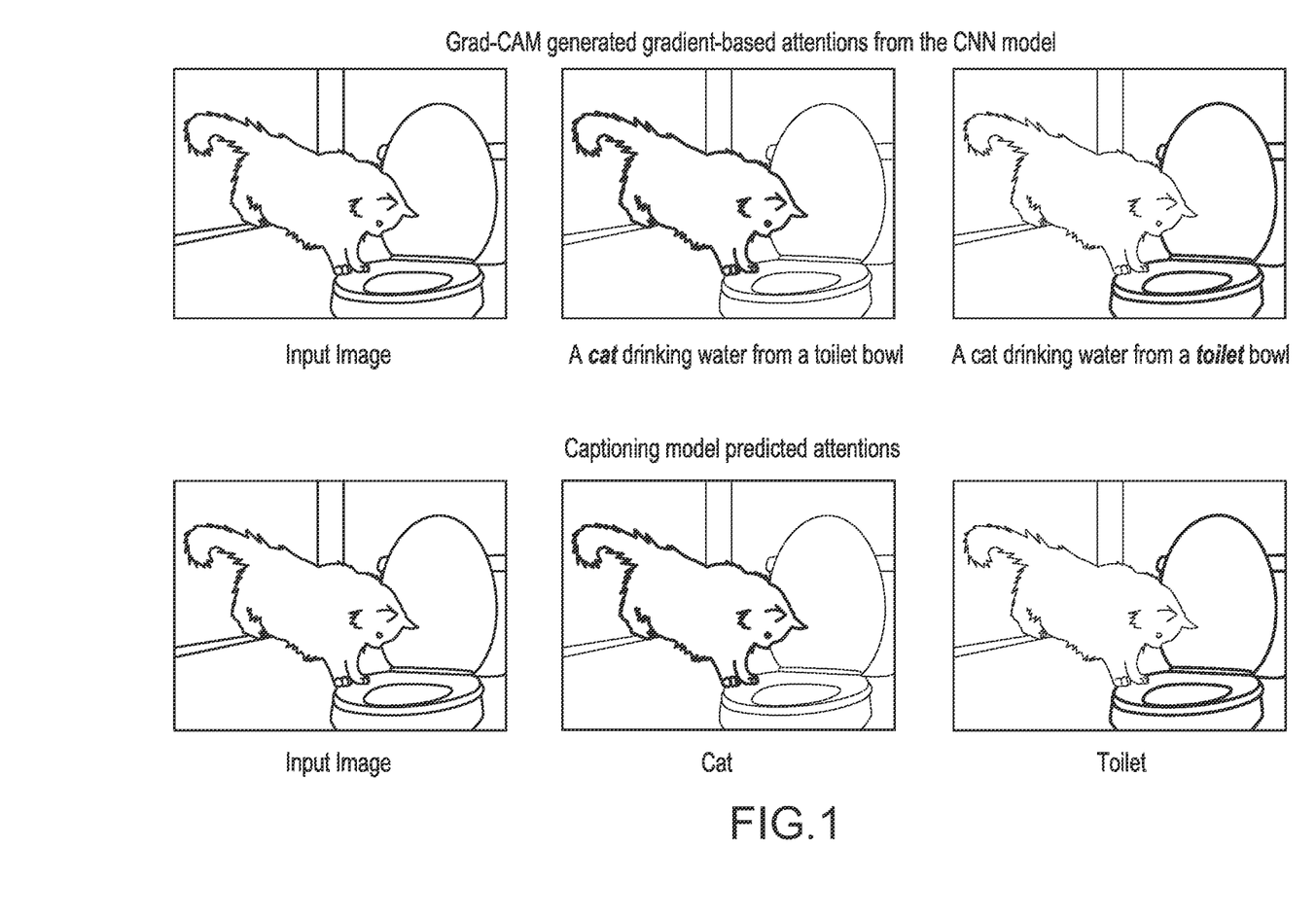
FIG. 1 illustrates two types of attention maps: gradient-based intrinsic attentions from a convolutional neural network (CNN) model and attention maps generated by attention modules in a captioning model.

Embodiments described herein include a novel image captioning model, which leverages attention maps from: 1) gradients-based weakly-supervised models, such as gradient-weighted class activation mapping (Grad-CAM) and 2) the state-of-the-art bottom-up and top-down attention mechanism in captioning models. Alignment between attention maps produced by two different mechanisms: captioning attentions and gradient-based CNN attentions can be analyzed. Grad-CAM, which has been mainly used for CNN model visualization, can be incorporated to generate saliency maps for each visual concept in the image caption. Specifically, as shown in FIG. 1 the alignment between intrinsic CNN saliency maps and predicted attentions enables the captioning model to better attend to relevant image regions and "tell" the sentence according to what has been "seen". Ideally, for every visual word (e.g. cat and toilet), the two attention maps would be aligned.

In some instances, image captioning models may contain both a language model (e.g., LSTM) and a visual model (e.g., CNN), and may follow the "encoder-decoder" architecture. Instead of encoding the entire image into one static representation, the attention mechanism, which is shown to be very effective in captioning models, allows the network to "look at" different parts of the image when generating different words. In some instances, image features are utilized from a pre-trained CNN and a hidden state of the LSTM $h_t$ to predict which region to focus on at each step t. If parameters in the captioning model are denoted as $\theta$ and words generated in the previous $t-1$ steps are denoted as $y_{1:t-1}$, the overall objective of many captioning models can be defined in Eq (1) as:

$$\theta^* = \mathrm{argmin}_\theta \sum_t \log(p(y_t|y_{1:t-1}; \theta)) \tag{1}$$

However, attention maps of these methods are only implicitly trained with negative log likelihood loss from words as defined in Eq (1). More importantly, such attention maps fail to take into account intrinsic saliency maps from the visual model. The model described herein incorporates gradient-based attention information from the visual model by aligning the intrinsic attention with the predicted attention.

State-of-the-art CNN models are embedded in many image captioning models to extract visual representations for a given image I. Visual features of k image regions from the last convolutional layer before the fully connected layer can be flattened and represented as a set of feature vectors $V \in \mathbb{R}^{k \times d}$ as defined in Eq (2), each of which is a d dimensional feature vector $v_i \in \mathbb{R}^d$ corresponding to one region of the image. For example, the size of the feature maps from the last convolutional layer may be 512×7×7, where 512 is the number of filters. These feature maps can then be flattened into 512×49 features, which corresponds to d=512 dimensional feature vectors from k=49 image regions.

$$V := \{v_i\}_{i=1}^{k}, \text{ where } v_i \in \mathbb{R}^d \quad (2)$$

Figure 2:
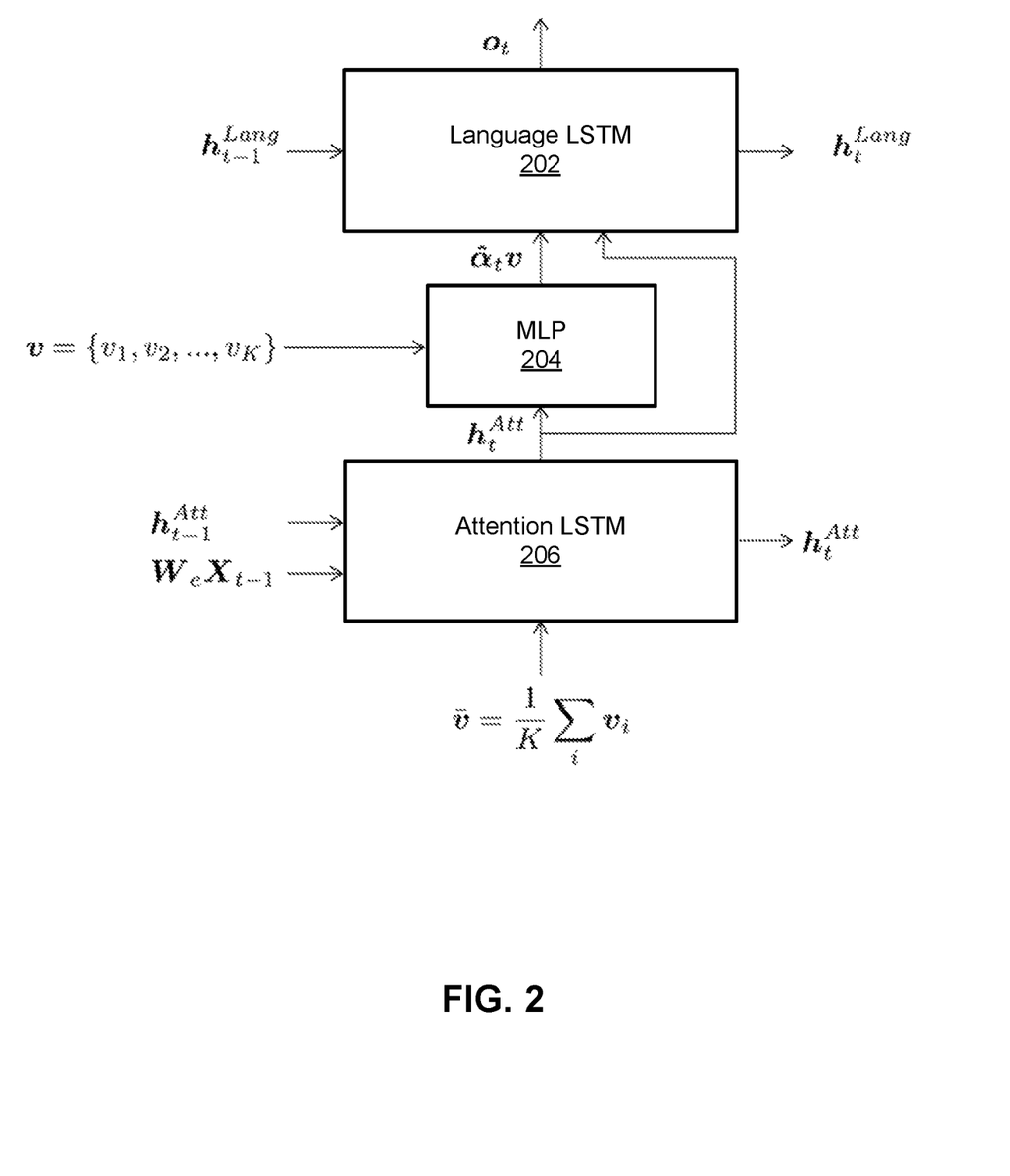
FIG. 2 illustrates an attention mechanism in a captioning model utilizing both top-down attention from average pooling features and bottom-up attention from visual representations of different regions.

If the hidden states of the LSTM are denoted as $h \in \mathbb{R}^n$, the attention map $\hat{\alpha}_t$ at each time step t can be determined by different types of attention models $f_{att}(v, h)$. $f(\cdot)$ can be a multi-layer perceptron (MLP) or an LSTM. In MLP-based attention models, spatial image features combined with hidden states of the LSTM at previous time step $h_{t-1}$ or the current step $h_t$ are fed into a fully connected layer followed by a softmax layer to generate attention distributions over k regions. For example, the attention module conditioned on the previous time step $h_{t-1}$ can be defined in Eq (3) as:

$$\hat{\alpha}_t = \text{softmax}[\omega_c^T \tan h(W_v V + W_h h_{t-1} 1^T)] \quad (3)$$

where $W_v \in \mathbb{R}^{k \times d}$, $W_h \in \mathbb{R}^{k \times n}$ and $\omega_c \in \mathbb{R}^k$ are trainable parameters of the MLP. $1 \in \mathbb{R}^k$ is a vector with all elements that equal to 1. Attention modules can also be modeled with a LSTM, which takes previous hidden states $h_{t-1}$, the embedding of previous generated word $W_e X$, and the average pooled visual features $\bar{v} = 1/K \Sigma_i v_i$ as inputs. Outputs from the attention LSTM, $h_{att}$ are fed into a fully connected layer and a softmax layer to predict attention weights, as defined in Eq (4) as:

$$h_{att} = \text{LSTM}(h_{t-1}, \bar{v}, W_e^T X_{t-1})$$

$$\hat{\alpha}_t = \text{softmax}[\omega_c^T \tan h(W_v V + W_h h_{att} 1^T)] \quad (4)$$

where $X \in \mathbb{R}^{m \times m}$ is the one-hot representation for the vocabulary of size m. $W_e \in \mathbb{R}^{m \times e}$ are parameters for e dimensional word embedding. This approach combines both bottom-up and top-down features and has been shown to be effective. FIG. 2 illustrates an attention architecture in accordance with some embodiments, including a language LSTM 202, an MLP 204, and an attention LSTM 206. In some embodiments, fine-grained labels may not be utilized and bottom-up features may be obtained from grid-based image regions instead of object regions defined by bounding-box annotations.

In some embodiments, visual attentions can be generated from the CNN, which will be incorporated in the attention penalty. The CNN model, known as the encoder in image captioning models, can not only provide rich visual representations, but also generate weakly-supervised localization of discriminative image regions for a given target concept. The Grad-CAM, for instance, can be utilized to produce "visual explanation maps", which may help understand the decision making process of deep neural networks. Given a trained CNN model and a target class c, in order to visualize discriminative regions, the compute network outputs $o_c$ can be computed before the softmax layer for class c. Next, gradients of $o_c$ with respect to activations $A^l$ of l-th feature map in the convolutional layer can be obtained through backpropagation. Global average pooling over k regions can be used to generate weights that represent the importance of w×h feature maps. Weighted combination of d dimensional feature maps can then determine the attention distribution of k regions for predicting the target class c as defined in Eq (5) as follows:

$$\theta_l^c = \frac{1}{Z} \sum_{i \in w} \sum_{j \in h} \frac{\partial o_c}{\partial A_{i,j}^l} \quad (5)$$

$$\alpha^c = \text{ReLU}\left(\sum_{l=1}^{d} \theta_l^c A^l\right)$$

where Z=w×h is the normalization constant. The Grad-CAM produces a coarse heat map of c-th class, $\alpha^c$, which has the same spatial size as feature maps of the convolutional layer i (e.g., if i is the last convolutional layer of the ResNet, the size of $\alpha^c$ will be 7×7). The ReLU function removes the effect of pixels with negative weights, since they do not have a positive influence in predicting the current class.

Figure 3:
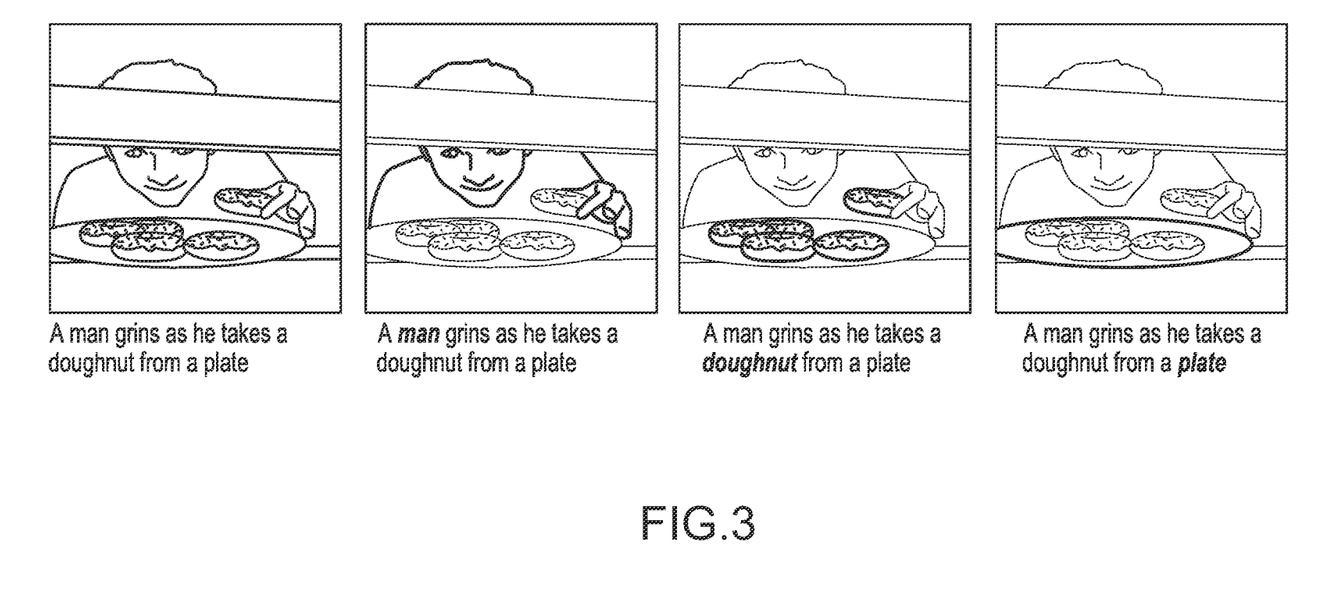
FIG. 3 illustrates attention maps generated for various words in a caption.

The Grad-CAM is able to highlight salient image parts for various types of neural networks, such as image captioning models. In some embodiments, attention maps for a given caption can be generated by computing gradients of its log likelihood with respect to the last convolutional layer of the encoder. However, these attention maps can be static at different time steps. If the caption contains multiple visual concepts, the model will identify discriminative regions for all targets at once. For example, given the caption that "A man grins as he takes a doughnut from a plate" as shown in FIG. 3, backpropagating its log likelihood will produce an attention map highlighting "man" "doughnut" and "plate".

In order to generate attention maps dynamically with the Grad-CAM, in some embodiments, the caption can be parsed to identify words that may be related to visual concepts (e.g., nouns). A word-to-object category mapping dictionary, which maps specific visual words to general object concepts (e.g., mapping the word "kitten" to the "cat" category), can either be manually built or automatically constructed by measuring cosine similarity between the word and the object category in the word embedding space. The image can have one or multiple labels according to object categories mentioned in captions. Next, the CNN model pre-trained on ImageNet can be fine-tuned using the multi-label multi-class classification objective. Instead of computing gradients of negative log probability of a caption, gradients of class scores can be calculated for a given visual word. Hence, different attention maps can be generated for different visual concepts in the caption as shown in FIG. 3. In the illustrated embodiment, the pre-trained CNN is fine-tuned with labels generated by parsing captions and mapping visual concepts to object categories. For each visual word, the attention map is produced by computing gradients of CNN outputs with respect to the last convolutional layer. Note that "man", "doughnut", and "plate" are highlighted individually in different attention maps.

In some instances, the captioning-based attention maps are only trained with negative log likelihood loss of generated word sequences, and there is no explicit loss for attention maps. In some instances, adding a supervised additional penalty in the loss function can improve quality of both generated attention maps and captions. The supervised attention penalty provides a way to quantize the consistency between the predicted attention and bounding boxes annotations of noun entities.

However, obtaining a large amount of bounding box annotations for a new dataset can be expensive and time-consuming. In some embodiments, the weakly-supervised attention alignment model computes the differences between predicted and gradient-based saliency maps without requiring any manually fine-grained labels. The attention module uses visual features from the CNN model and outputs from the LSTM to predict which part of the image the captioning model should pay attention to when generating the current word $X_t$. Ideally, for any given visual concept, the predicted attention distribution should align with the gradient-based CNN attention map.

During training, in order to predict the current word, the captioning model uses the textual context from the word embedding of the previous word and the previous LSTM hidden states, as well as visual context from the weighted image features. These weights $\hat{\alpha}$ that are obtained from the attention module $f_{att}$ essentially approximate the importance of image parts when generating the current word. Meanwhile, the gradient-based attention distribution $\alpha$ from the Grad-CAM highlights the relevant regions given the ground truth of the current word $X_t$. In some embodiments, $\hat{\alpha} \in \mathbb{R}^k$ and $\alpha \in \mathbb{R}^k$ can be considered as two probability distributions, and cross entropy loss can be used to measure discrepancies between two distributions. If the current word is not a noun or is not included in the object category dictionary, the attention penalty can be set to 0, since the loss can be ambiguous to define. The training objective of the model can be summarized in Eq (6) and Eq (7) as follows:

$$L_t^{Att} = \begin{cases} -\sum_{k=1}^{K} \alpha_{ti} \log \hat{\alpha}_{ti}, & \text{if } \alpha_t \text{ exists for } x_t \\ 0, & \text{otherwise} \end{cases} \quad (6)$$

$$L_t = \sum_t^T L_t^{Cap} + \lambda \sum_t^T L_t^{Att} \quad (7)$$

$$L_t^{Cap} = -\log[p(y_t|y_{1:t-1}; \theta)]$$

Figure 4:
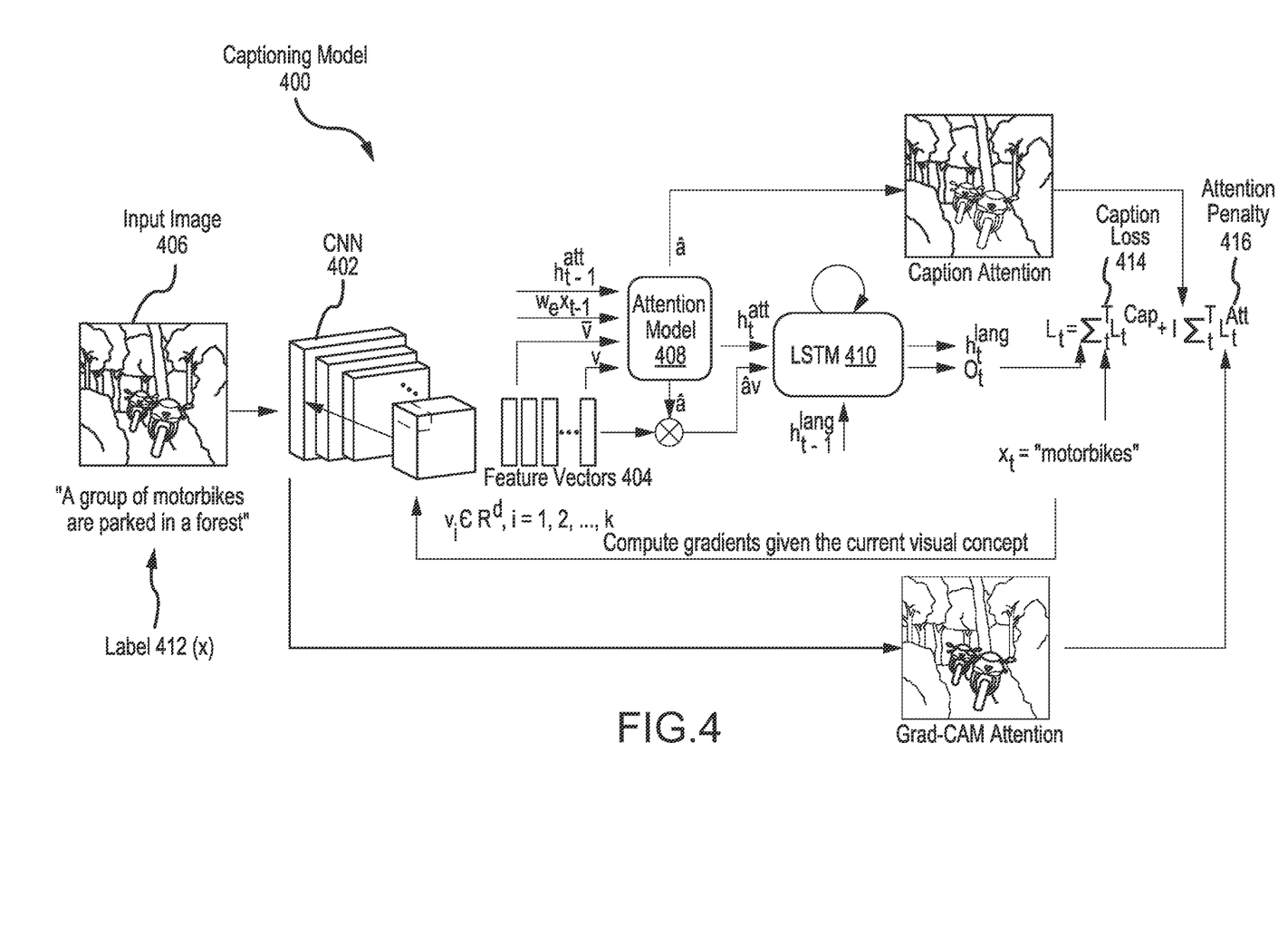
FIG. 4 illustrates a block diagram of an architecture of a captioning model.

FIG. 4 illustrates a block diagram of an architecture of a captioning model 400, according to some embodiments of the present disclosure. Captioning model 400 includes a CNN 402, an attention model 408, and an LSTM 410. CNN 402 may be configured to generate a plurality of feature vectors 404 based on an input image 406. During training, captioning model 400 is provided with a label 412 along with input image 406, and a loss function $L_t$ is calculated based on a combination (e.g., summation) between a caption loss 414 and an attention penalty 416.

Captioning model 400 can roughly be divided into three parts, a visual part (e.g., CNN 402), an attention module (e.g., attention model 408) and a language part (e.g., LSTM 410). In some embodiments, CNN 402 can encode input image 406 into d×w×h feature maps, which can be flattened into k feature vectors corresponding to k regions. Attention model 408 can use bottom-up top-down features and embeddings of previously generated words to predict relevant areas for generating a current word. LSTM 410 can take weighted feature maps and previous hidden states as inputs and predict the current word. In addition to the caption loss, the cross entropy loss between predicted and intrinsic gradient-based attention maps can be computed.

Captioning model 400 was tested using a large-scale dataset for image captioning, segmentation, classification and object detection, containing 82,783 images for training, 40,504 for validation, and 40,775 for testing. Each image was annotated by 5 crowdsourced captions. Train/validation splits were used containing 5000 images for validation and 5000 for testing. The Stanford CoreNLP was utilized to parse captions into tokens, and a vocabulary was built by using words that appeared more than 5 times in the dataset. The maximum length of captions was set to be 20.

Captioning model 400 was also tested using the largest available genealogy dataset that contains around billions of digitized historical photos uploaded by users. 2 crowdsourced captions per image were collected for around 10,000 images. Human annotators followed an annotation protocol, and the annotation was performed using a labeling tool. In the genealogy dataset, historical images contain objects that are less common in comparison to modern datasets (e.g., horse-drawn carriages are quite common in historical photos but not in modern pictures).

During testing, word to object mapping was built that has mappings between 413 fine-grained classes and 80 object categories. The ResNet-101 was adopted that had been pre-trained on ImageNet as the feature extractor in the captioning model. To fine-tune the model on the large-scale dataset, instead of relying on bounding boxes, visual concepts generated from image captions were used as labels for classification models. The fully connected layer with 1000 output neurons was replaced by one with 80 outputs corresponding to 80 object categories in the large-scale dataset. The fully connected layer was trained with an initial learning rate at 0.0001 for 50 epochs. Since shallow layers in CNN models tend to learn more general representations, the whole model was fine-tuned except for the first two convolutional blocks for the ResNet-101 model with an initial learning rate at 0.00001.

The attention penalty was computed by aligning the LSTM predicted attention with CNN-based saliency maps for every visual concept in the captions. Specifically, the category of each visual word was backpropagated to the last convolutional layer of the trained feature extractor (ResNet-101) to generate class-specific attention maps. A word embedding size of 512 was used. The hidden size of the attention LSTM and the language LSTM was set at 1024. To incorporate the attention alignment penalty into the final loss function, both adaptive and constant λ were analyzed, with the constant λ at 100 giving the best performance. The Adam optimizer and an initial learning rate starting at 0.0005 for captioning model optimization were used. The scheduled sampling was used to reduce differences between sentence generation during training and inference. The beam size was set at 3 for model evaluation.

Figure 5:
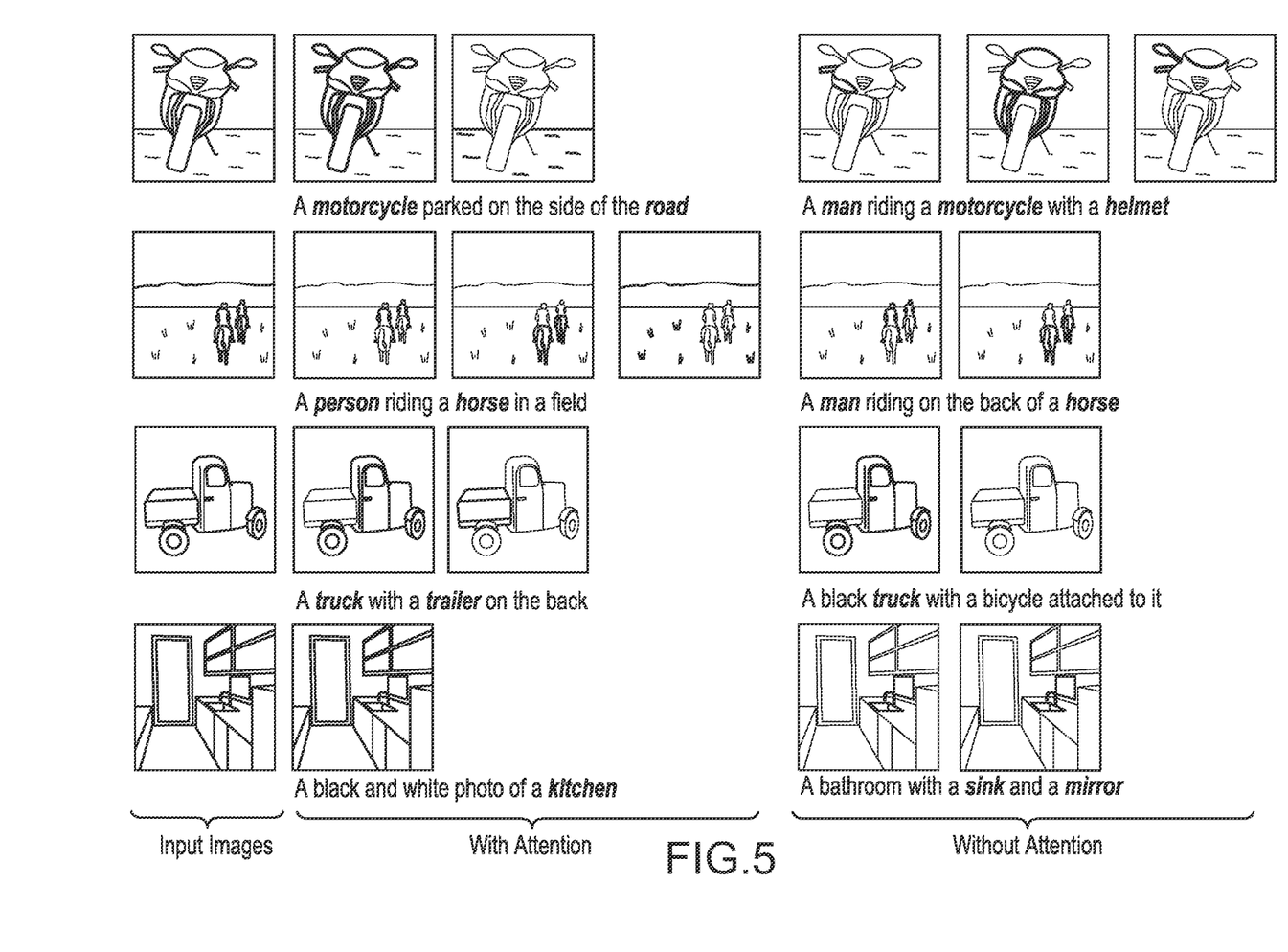
FIG. 5 illustrates sample results on a dataset for both a proposed model (with attention) and an ablated model (without attention).

The results of the testing showed that using the attention penalty led to increased performance of the model. It could be observed that when the predicted attention maps became less meaningful, the captioning model produced sentences that were less grounded in the image. For example, the left side of the first row in FIG. 5 shows a motorcycle. However, the attention map generated by the ablated model (without attention) failed to highlight relevant regions, and generated words such as "man" and "helmet" were not grounded in the image. The additional attention alignment loss can help the captioning model to focus on relevant regions during the sentence generation (with attention).

Figure 6:
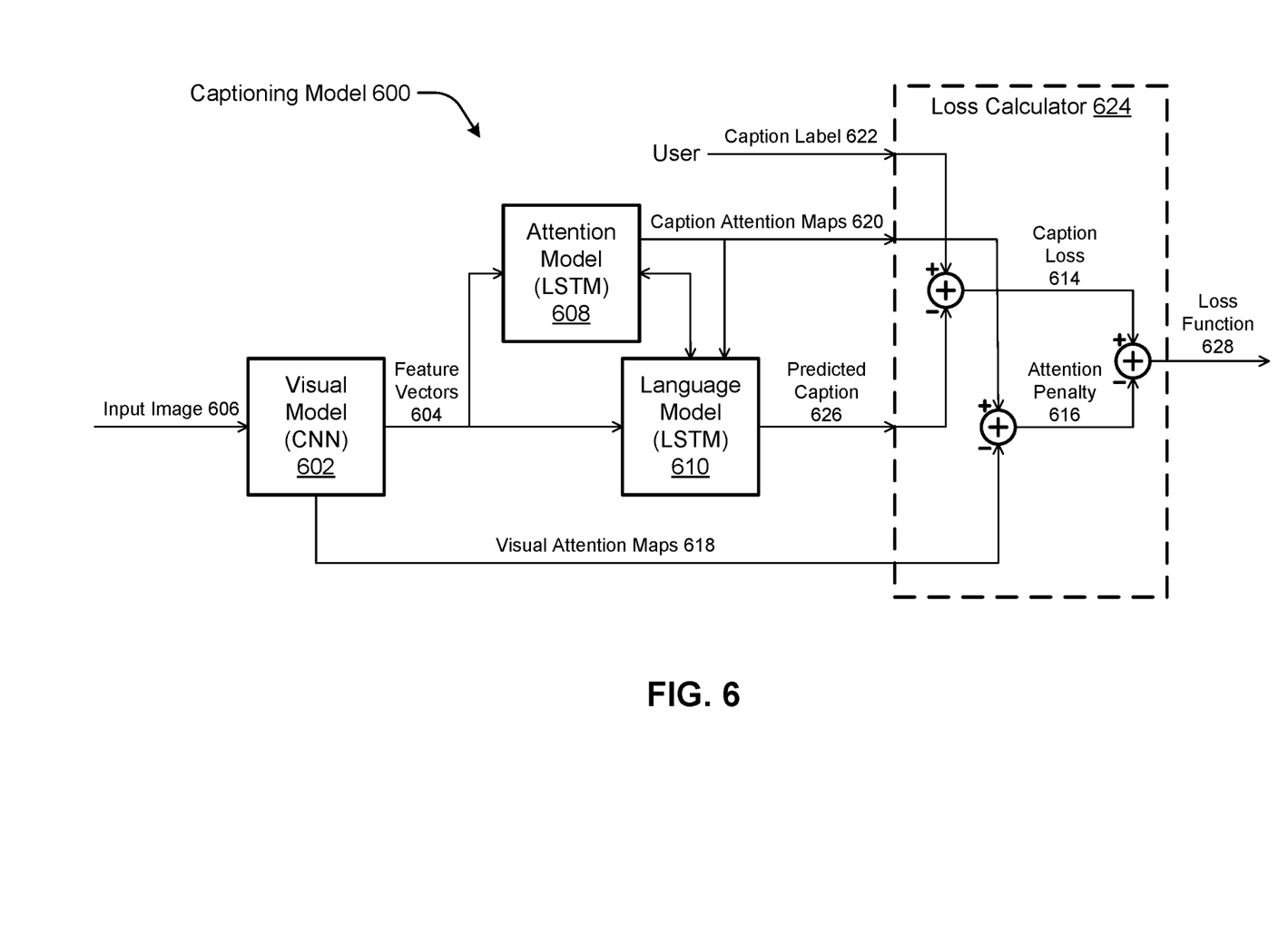
FIG. 6 illustrates a block diagram of a model for captioning images.

FIG. 6 illustrates a block diagram of a captioning model 600 for captioning images, according to some embodiments of the present disclosure. One or more components of captioning model 600 may be similar to one or more components of captioning model 400 described in reference to FIG. 4. Captioning model 600 may be a machine learning (ML) model that includes one or more ML models. For example, captioning model 600 may include a visual model 602, which may be a CNN. Visual model 602 may receive an input image 606 and generate a set of feature vectors 604 based on input image 606. Visual model 602 may also generate a set of visual attention maps 618 based on input image 606. In some embodiments, visual attention maps 618 may be probability distributions.

In some embodiments, captioning model 600 includes an attention model 608, which may be an LSTM model. Attention model 608 may generate a set of caption attention maps 620 based on feature vectors 604. In some embodiments, caption attention maps 620 may be probability distributions.

In some embodiments, captioning model 600 includes a language model 610, which may be an LSTM model. Language model 610 may generate a predicted caption 626 based on feature vectors 604 and/or caption attention maps 620. Predicted caption 626 may include one or more words providing a description for input image 606.

During training, a loss calculator 624 may be used to calculate a loss function 628, which may be used to train captioning model 600. For example, loss function 628 may be used to train visual model 602, attention model 608, and/or language model 610 by, for example, modifying a set of weights associated with each respective model. The amount by which the set of weights are modified may be proportional to the magnitude of loss function 628, such that larger values of loss function 628 lead to greater modifications to the set(s) of weights associated with visual model 602, attention model 608, and/or language model 610. In some embodiments, loss calculator 624 receives a caption label 622 provided by a user. For example, caption label 622 may be inputted by a user using a user input device, such as a keyboard, a mouse, a touchscreen, a keypad, and the like. The user may input caption label 622 upon examining a training image, such as input image 606.

Loss calculator 624 may calculate loss function 628 by combining two separate loss components. The first component is a caption loss 614, which is calculated based on caption label 622 and predicted caption 626. In some embodiments, caption loss 614 is calculated by comparing predicted caption 626 to caption label 622 and, in some embodiments, calculating a difference between predicted caption 626 and caption label 622. In some embodiments, various distance metrics may be utilized to calculate caption loss 614. For example, the Jaro-Winkler distance may be used to measure the distance between the two sequences of words. In some embodiments, only nouns may be used when calculating caption loss 614.

The second component of loss function 628 is attention penalty 616, which is calculated based on visual attention maps 618 and caption attention maps 620. In some embodiments, attention penalty 616 is calculated by comparing visual attention maps 618 to caption attention maps 620 by, in some embodiments, calculating a difference between attention maps 618 and caption attention maps 620. In some embodiments, a difference map may be calculated as the difference between attention maps 618 and caption attention maps 620, and the sum of all the values of the difference map may be used as attention penalty 616. Various distance metrics may be utilized to calculate attention penalty 616, such as the cross entropy or Wasserstein distance.

Figure 7:
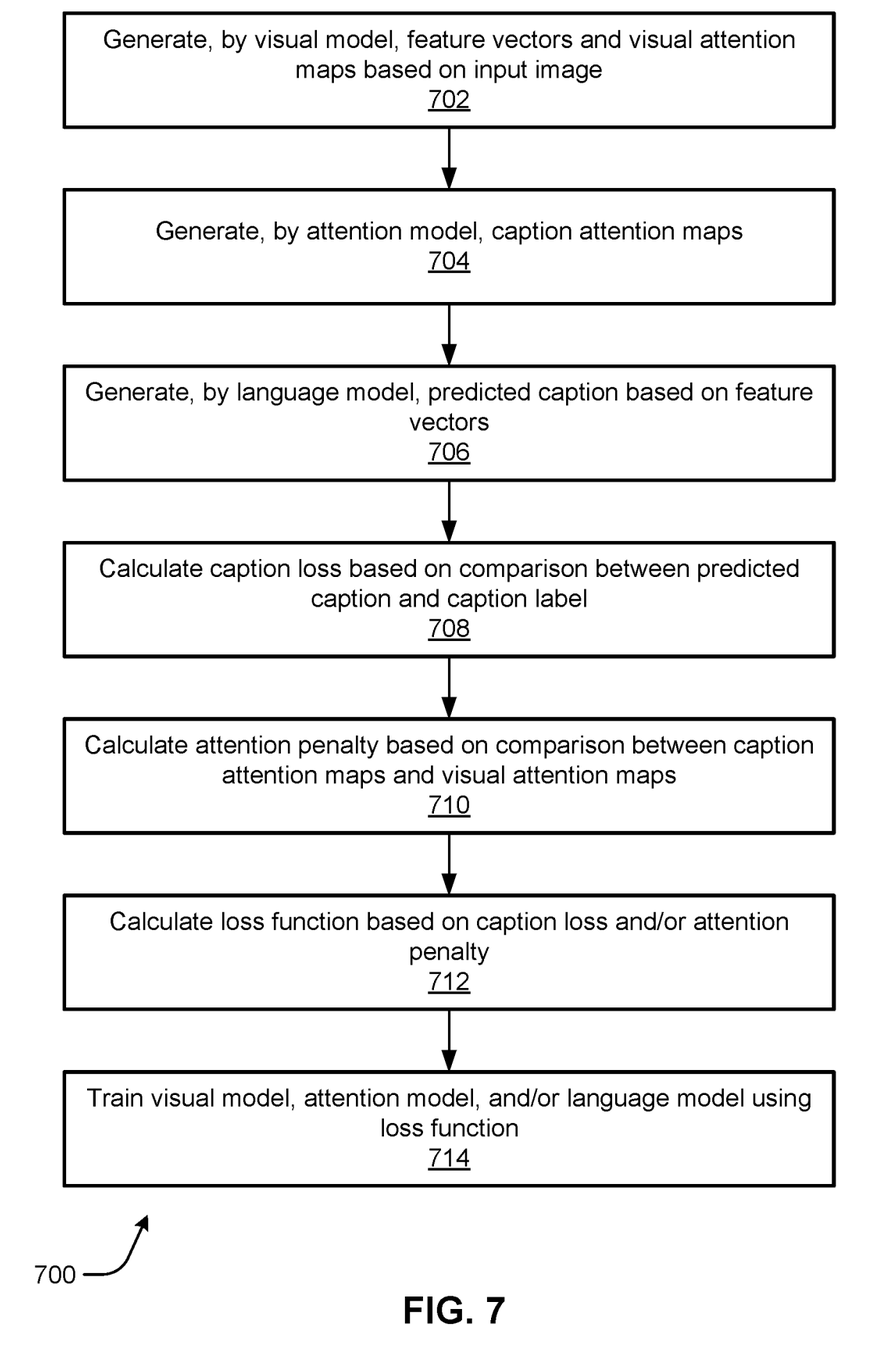
FIG. 7 illustrates an example method for training a machine learning (ML) model.

FIG. 7 illustrates an example method 700, according to some embodiments of the present invention. One or more steps of method 700 may be performed in an order different than that shown in FIG. 7, and one or more steps of method 700 may be omitted during performance of method 700. In some embodiments, method 700 is a method for training an ML model for captioning images.

At step 702, a plurality of feature vectors and/or a plurality of visual attention maps are generated based on an input image. In some embodiments, the plurality of feature vectors and/or the plurality of visual attention maps are generated by a visual model of the ML model. In some embodiments, the visual model is a CNN.

At step 704, a plurality of caption attention maps are generated based on the plurality of feature vectors. In some embodiments, the plurality of caption attention maps are generated by an attention model of the ML model. In some embodiments, the attention model is an LSTM model.

At step 706, a predicted caption is generated based on the plurality of feature vectors and/or the plurality of caption attention maps. In some embodiments, the predicted caption is generated by a language model of the ML model. In some embodiments, the language model is an LSTM model.

At step 708, a caption loss is calculated based on a comparison between the predicted caption and the caption label.

At step 710, an attention penalty is calculated based on a comparison between the plurality of caption attention maps and the plurality of visual attention maps.

At step 712, a loss function is calculated based on at least the caption loss and/or the attention penalty.

At step 714, the visual model, the attention model, and/or the language model are trained using the loss function.

Figure 8:
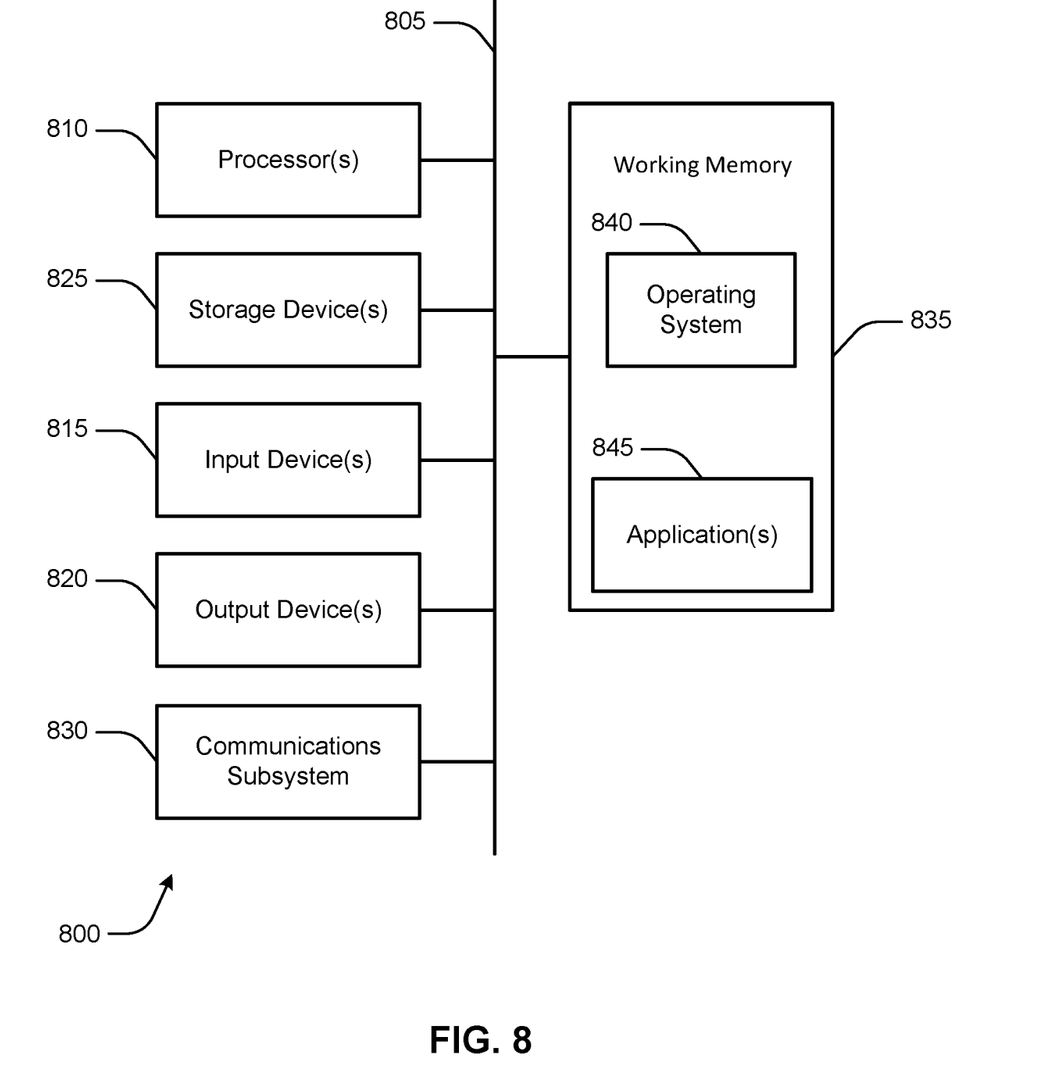
FIG. 8 illustrates a simplified computer system.

FIG. 8 illustrates a simplified computer system 800, according to some embodiments of the present invention. FIG. 8 provides a schematic illustration of one embodiment of a computer system 800 that can perform some or all of the steps of the methods provided by various embodiments. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805, or may otherwise be in communication, as appropriate. The hardware elements may include one or more processors 810, including without limitation one or more general-purpose processors and/or one or more special-purpose processors such as digital signal processing chips, graphics acceleration processors, and/or the like; one or more input devices 815, which can include without limitation a mouse, a keyboard, a camera, and/or the like; and one or more output devices 820, which can include without limitation a display device, a printer, and/or the like.

The computer system 800 may further include and/or be in communication with one or more non-transitory storage devices 825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 830 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 830. In other embodiments, a portable electronic device, e.g. the first electronic device, may be incorporated into the computer system 800, e.g., an electronic device as an input device 815. In some embodiments, the computer system 800 will further comprise a working memory 835, which can include a RAM or ROM device, as described above.

The computer system 800 also can include software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 8, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 825 described above. In some cases, the storage medium might be incorporated within a computer system, such as computer system 800. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 800 to perform methods in accordance with various embodiments of the technology. According to a set of embodiments, some or all of the procedures of such methods are performed by the computer system 800 in response to processor 810 executing one or more sequences of one or more instructions, which might be incorporated into the operating system 840 and/or other code, such as an application program 845, contained in the working memory 835. Such instructions may be read into the working memory 835 from another computer-readable medium, such as one or more of the storage device(s) 825. Merely by way of example, execution of the sequences of instructions contained in the working memory 835 might cause the processor(s) 810 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 800, various computer-readable media might be involved in providing instructions/code to processor(s) 810 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 825. Volatile media include, without limitation, dynamic memory, such as the working memory 835.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 830 and/or components thereof generally will receive signals, and the bus 805 then might carry the signals and/or the data, instructions, etc. carried by the signals to the working memory 835, from which the processor(s) 810 retrieves and executes the instructions. The instructions received by the working memory 835 may optionally be stored on a non-transitory storage device 825 either before or after execution by the processor(s) 810.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A computer-implemented method of training a machine learning model for captioning images, the computer-implemented method comprising:
receiving an input image;
generating, using a visual model and based on the input image, a feature vector and a visual attention map;
generating, using an attention model and based on the feature vector, a caption attention map;
generating, using a language model and based on one or both of the feature vector and the caption attention map, a predicted caption for the input image;
calculating (i) a caption loss based on a comparison between the predicted caption and a manual caption label and (ii) an attention penalty based on a comparison between the caption attention map and the visual attention map; and
calculating a loss function based on the caption loss and the attention penalty.

2. The computer-implemented method of claim 1, wherein one or more of the visual model, the attention model, and the language model is trained by:
modifying a set of weights of one or more of the visual model, the attention model, and the language model proportional to a magnitude of the loss function.

3. The computer-implemented method of claim 1, further comprising:
parsing the predicted caption to identify one or more words related to visual concepts using a category mapping dictionary.

4. The computer-implemented method of claim 3, wherein the visual model is a pre-trained convolutional neural network.

5. The computer-implemented method of claim 3, wherein the visual model is fine-tuned using the visual concepts.

6. The computer-implemented method of claim 5, wherein one or more different attention maps are generated for one or more different visual concepts in the predicted caption.

7. The computer-implemented method of claim 1, wherein the language model is a long short-term memory model.

8. The computer-implemented method of claim 1, wherein the attention model comprises one or more of a long short-term memory model and a multi-layer perceptron.

9. A hardware storage device having stored thereon computer-executable instructions that, when executed by one or more processors, configure a computer system to perform at least the following:
receive an input image;
generate, using a visual model and based on the input image, a feature vector and a visual attention map;
generate, using an attention model and based on the feature vector, a caption attention map;
generate, using a language model and based on one or both of the feature vector and the caption attention map, a predicted caption for the input image;
calculate (i) a caption loss based on a comparison between the predicted caption and a manual caption label and (ii) an attention penalty based on a comparison between the caption attention map and the visual attention map; and
calculate a loss function based on the caption loss and the attention penalty.

10. The hardware storage device of claim 9, wherein the computer-executable instructions further configure the computer system to:
train one or more of the visual model, the attention model, and the language model by modifying a set of weights of one or more of the visual model, the attention model, and the language model proportional to a magnitude of the loss function.

11. The hardware storage device of claim 10, wherein the visual attention map and the caption attention map are probability distributions.

12. The hardware storage device of claim 9, wherein a gradients-based weakly supervised model and bottom-up and top-down attention mechanism are used to generate the visual attention map and the caption attention map, respectively.

13. The hardware storage device of claim 9, wherein the visual model is fine-tuned using a multi-label multi-class classification objective.

14. The hardware storage device of claim 9, wherein the attention model is a LSTM model configured to generate the caption attention map using the feature vector as inputs.

15. The hardware storage device of claim 9, wherein the language model is a LSTM model configured to generate the predicted caption using one or more of the feature vector or the caption attention map as inputs.

16. The hardware storage device of claim 9, wherein for each visual word in the predicted caption, the visual attention map is generated by computing gradients of visual model outputs with respect to a last convolutional layer.

17. A system comprising:
one or more processors; and
one or more hardware storage devices having stored thereon computer-executable instructions that, when executed by the one or more processors, configure the system to perform at least the following:
receive an input image;
generate, using a visual model and based on the input image, a feature vector and a visual attention map;
generate, using an attention model and based on the feature vector, a caption attention map;
generate, using a language model and based on one or both of the feature vector and the caption attention map, a predicted caption for the input image;
calculate (i) a caption loss based on a comparison between the predicted caption and a manual caption label and (ii) an attention penalty based on a comparison between the caption attention map and the visual attention map; and
calculate a loss function based on the caption loss and the attention penalty.

18. The system of claim 17, wherein the one or more of the visual model, the attention model, and the language model is trained by performing at least the following:
modify a set of weights of one or more of the visual model, the attention model, and the language model proportional to a magnitude of the loss function.

19. The system of claim 18, wherein the loss function is calculated based on a summation of the caption loss and the attention penalty.

20. The system of claim 17, wherein the visual attention map is generated by a gradients-based weakly supervised model.

* * * * *